US012280473B2

(12) United States Patent
Liu

(10) Patent No.: US 12,280,473 B2
(45) Date of Patent: Apr. 22, 2025

(54) POWER TOOL AND MAIN SHAFT THEREOF

(71) Applicant: Jeff Liu, Taichung (TW)

(72) Inventor: Jeff Liu, Taichung (TW)

( * ) Notice: Subject to any disclaimer, the term of this patent is extended or adjusted under 35 U.S.C. 154(b) by 1145 days.

(21) Appl. No.: 17/141,529

(22) Filed: Jan. 5, 2021

(65) Prior Publication Data

US 2021/0122014 A1 Apr. 29, 2021

Related U.S. Application Data

(63) Continuation-in-part of application No. 16/008,292, filed on Jun. 14, 2018, now abandoned.

(30) Foreign Application Priority Data

Mar. 9, 2018 (TW) ................................ 107108130

(51) Int. Cl.
*B25B 21/02* (2006.01)
*B25D 17/26* (2006.01)

(52) U.S. Cl.
CPC ............ *B25B 21/02* (2013.01); *B25D 17/265* (2013.01); *B25D 2217/0096* (2013.01)

(58) Field of Classification Search
CPC .................. B25B 21/02; B25D 17/265; B25D 2217/0096
USPC ........................................................... 173/90
See application file for complete search history.

(56) References Cited

U.S. PATENT DOCUMENTS

2013/0180749 A1* 7/2013 Su .......................... B25B 21/02 173/216
2014/0367130 A1* 12/2014 Dougherty ............ B25B 21/026 81/464

* cited by examiner

*Primary Examiner* — Hemant Desai
*Assistant Examiner* — Mary C Hibbert-Copeland
(74) *Attorney, Agent, or Firm* — Egbert, McDaniel & Swartz, PLLC

(57) ABSTRACT

A main shaft of a power tool is sequentially divided into an impact section, a penetrative section and an output section, wherein the impact section is formed with an impact portion and has a curved recess defined therein, and the penetrative section is adapted to extend through a front portion of the power tool. The main shaft has a linear tunnel defined therein and extending therethrough. The linear tunnel has two opposite ends respectively defined as an inlet and an outlet, wherein the inlet is situated in the output section and the outlet is adapted to correspond to an impact block of an impact device of the power tool. An axis of the linear tunnel is formed an included angle with an axis of the main shaft.

18 Claims, 5 Drawing Sheets

POWER TOOL AND MAIN SHAFT THEREOF

CROSS-REFERENCE TO RELATED U.S. APPLICATIONS

The present application is a continuation-in-part of U.S. application Ser. No. 16/008,292, filed on Jun. 14, 2018, presently pending.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a power tool, and more particularly to a power tool and main shaft thereof, wherein the main shaft has a linear tunnel defined therein.

2. Description of Related Art Including Information Disclosed Under 37 CFR 1.97 and 37 CFR 1.98

As to a main shaft of a power tool (such as a pneumatic tool), the main shaft has a driving section corresponding to an impact device. A space is defined between the driving section and the impact device, wherein space needs to be lubricated for lengthening the use lift of the power tool. However, the lubricant will gradually drained after the power tool being used for a period of time. Consequently, the power tool needs to be regularly filled of lubricant.

However, it is very convenient for filling lubricant into a conventional power tool because the outer structures of the conventional power tool must be disassembled before filling lubricant. As a result, the lubricating operation needs a lot of time and the conventional power tool may be damaged because the conventional power tool needs to be regularly disassembled and assembled.

In view of this, some power tool manufacturers provide a main shaft having a lubricant inlet defined therein. However, the lubricant inlet is usually longitudinally defined in a distal end of the main shaft of the conventional power tool. The lubricant passage radially extends to an outer periphery of the main shaft after the lubricant passage extending to an impact section of the main shaft for overcoming the problem of the above conventional power tool that needs to be disassembled the outer structures before filling lubricant. As described above, the lubricant passage of the convention main shaft has an L-shaped cross-section. As a result, the lubricant will form a great back pressure during being filled into the power tool. Consequently, the filling operation becomes laborious and the lubricant may flow back to the lubricant inlet and adhered on the main shaft surrounding the lubricant inlet such that the backward lubricant may pollute the main shaft. Consequently, the debris may be adhered to the main shaft and unblock the lubricant inlet.

The present invention has arisen to mitigate and/or obviate the disadvantages of the conventional power tool and the main shaft of the conventional power tool.

BRIEF SUMMARY OF THE INVENTION

The main objective of the present invention is to provide an improved power tool that includes a main shaft having a linear runnel defined therein.

To achieve the objective, the power tool in accordance with the present invention comprises a casing divided into a handheld portion and a receiving portion. A motor is received in the receiving portion and adapted to be connected to a power source. An impact device is mounted into a front section of the receiving portion, wherein the impact device is connected to the motor and driven by the motor. A main shaft is rotatably mounted in the impact device for outputting power. The impact device includes a rotary seat having a passage laterally defined therein and a through hole longitudinally defined therein, wherein the through hole communicates with the passage and at least one impact block is mounted into the passage.

The main shaft of a power tool is adapted to be mounted into an impact device of a power tool, the main shaft is sequentially divided into an impact section, a penetrative section and an output section. The impact section is formed with at least one impact portion and has at least one curved recess defined therein, wherein the quantities of the at least one impact portion and the at least one curved recess are respectively relative to that of the at least one impact block, and the at least one impact portion corresponding to the at least one impact block. The output section and the penetrative section are adapted to sequentially extend through a front end of the power tool for outputting power. A linear tunnel is defined in the main shaft. The linear tunnel has two opposite ends respectively defined as an inlet and an outlet, wherein the inlet is situated in the output section, and the outlet is situated in the impact section and corresponds to the impact block. An axis of the linear tunnel and an axis of the main shaft form an included angle.

Further benefits and advantages of the present invention will become apparent after a careful reading of the detailed description with appropriate reference to the accompanying drawings.

DETAILED DESCRIPTION OF THE INVENTION

Figure 1:
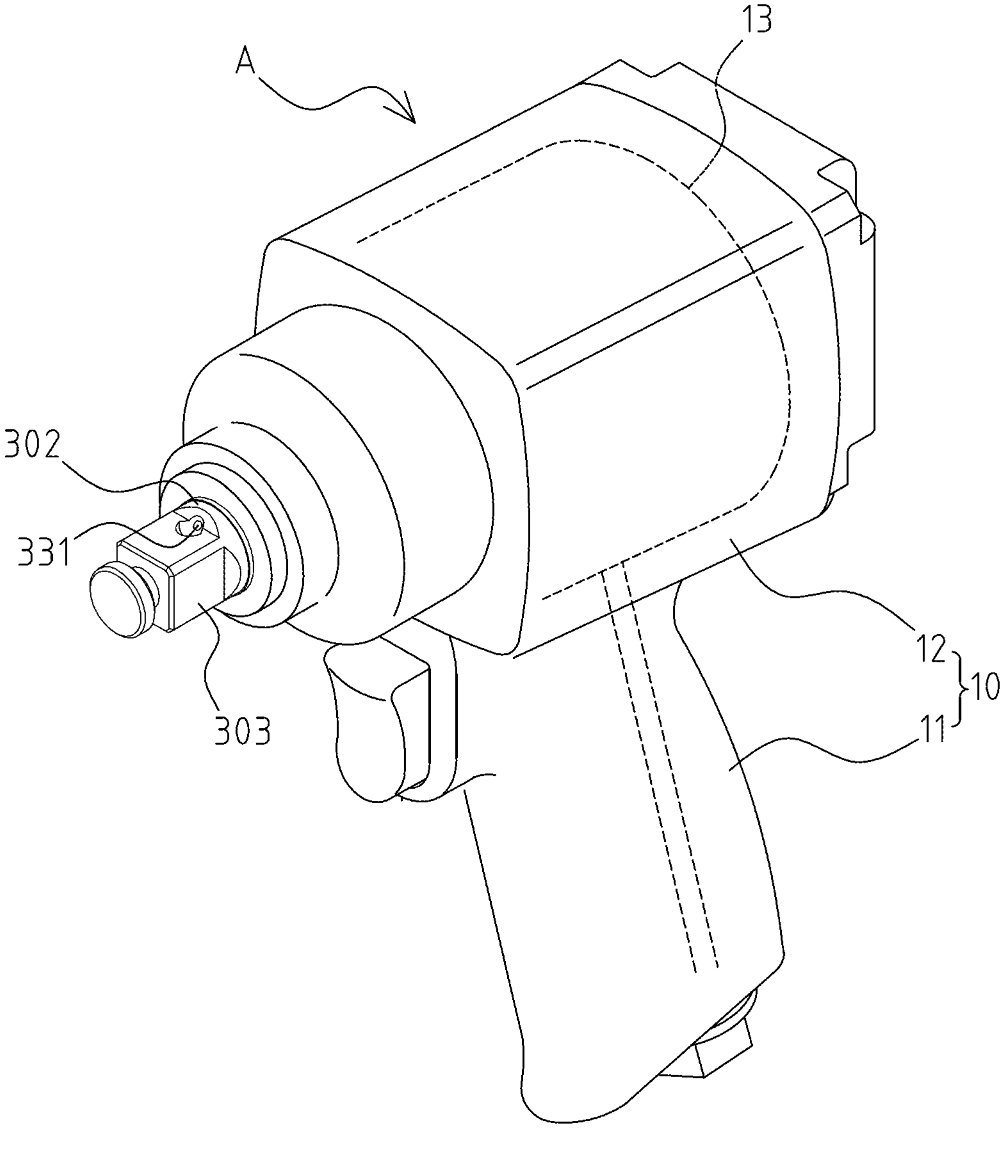
FIG. 1 is a perspective view of a power tool in accordance with the present invention.
Figure 2:
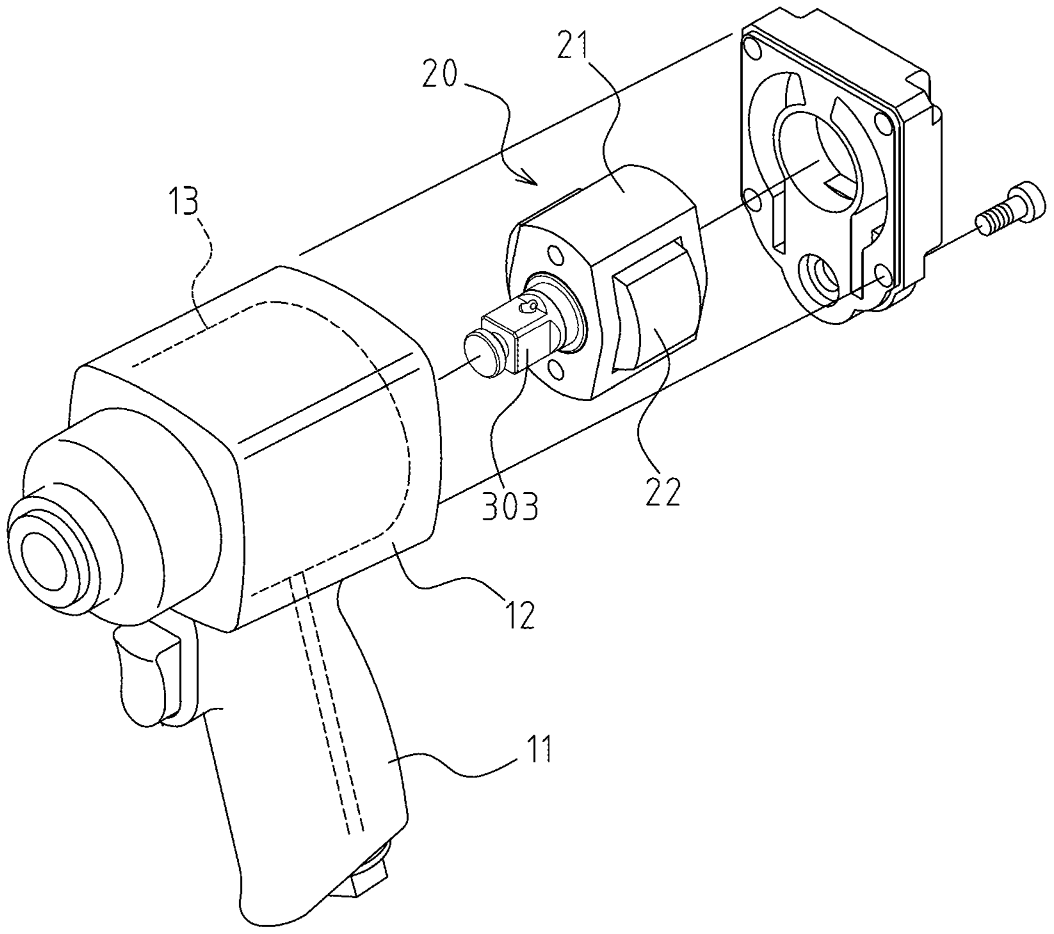
FIG. 2 is an exploded perspective of the power tool in FIG. 1.

Referring to the drawings and initially to FIGS. 1 and 2, a power tool A in accordance with the present invention comprises a casing 10 divided into a handheld portion 11 and a receiving portion 12. A motor 13 is received in the receiving portion 12 and adapted to be connected to a power source (not shown), wherein the power is a current source or a high-pressure air source. An impact device 20 is mounted into a front section of the receiving portion 12, wherein the impact device 20 is connected to the motor 13 and driven by the motor 13. A main shaft 30 is rotatably mounted in the impact device 20 for outputting power.

Figure 3:
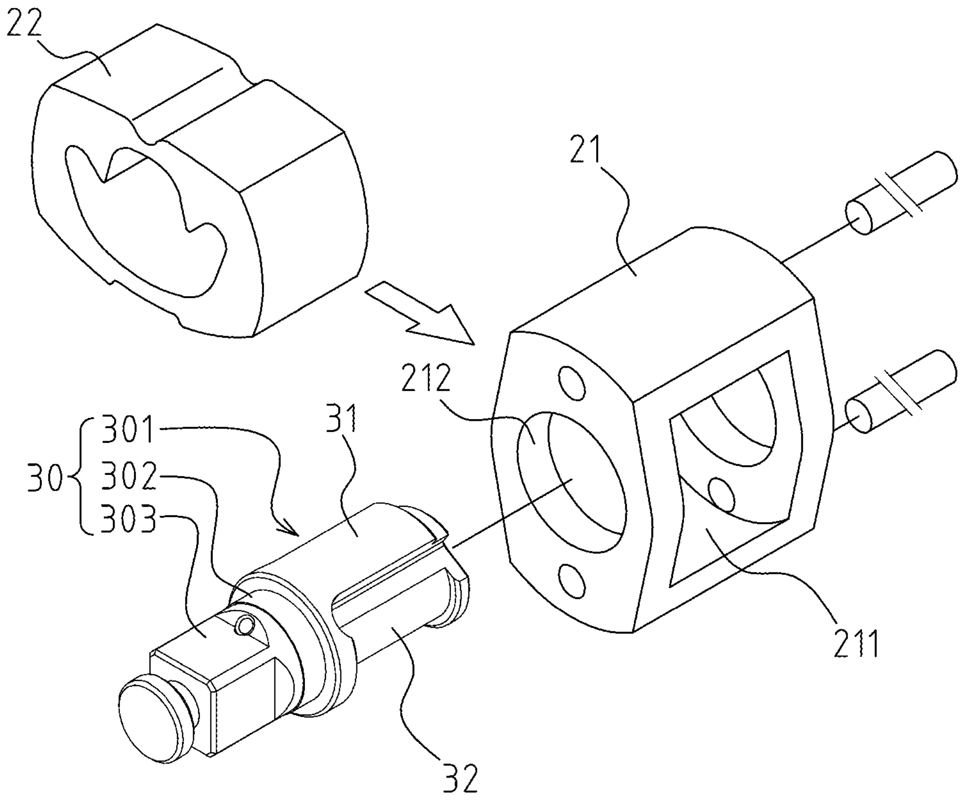
FIG. 3 is an exploded perspective view of an impact device of the power tool in FIG. 1.

Further with reference to FIG. 3, the impact device 20 includes a rotary seat 21 having a passage 211 laterally defined therein and a through hole 212 longitudinally defined therein, wherein the through hole 212 communicates with the passage 211 and at least one impact block 22 is mounted into the passage 211.

Figure 4:
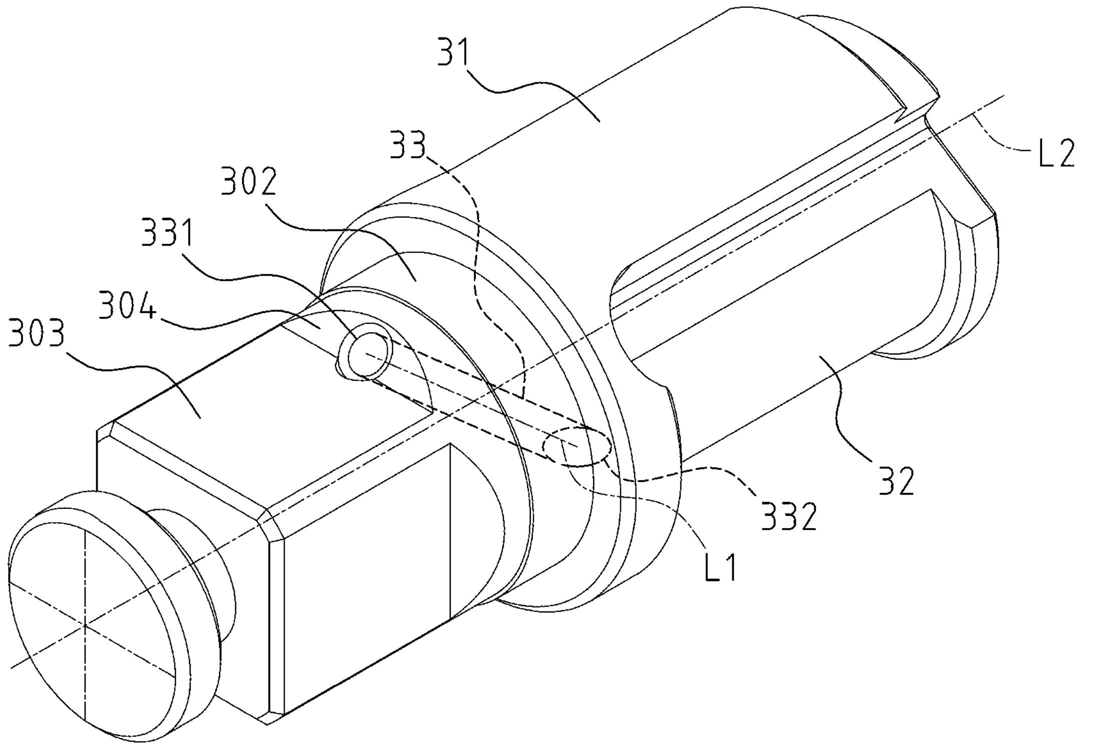
FIG. 4 is a perspective view of a main shaft in accordance with the present invention.
Figure 5:
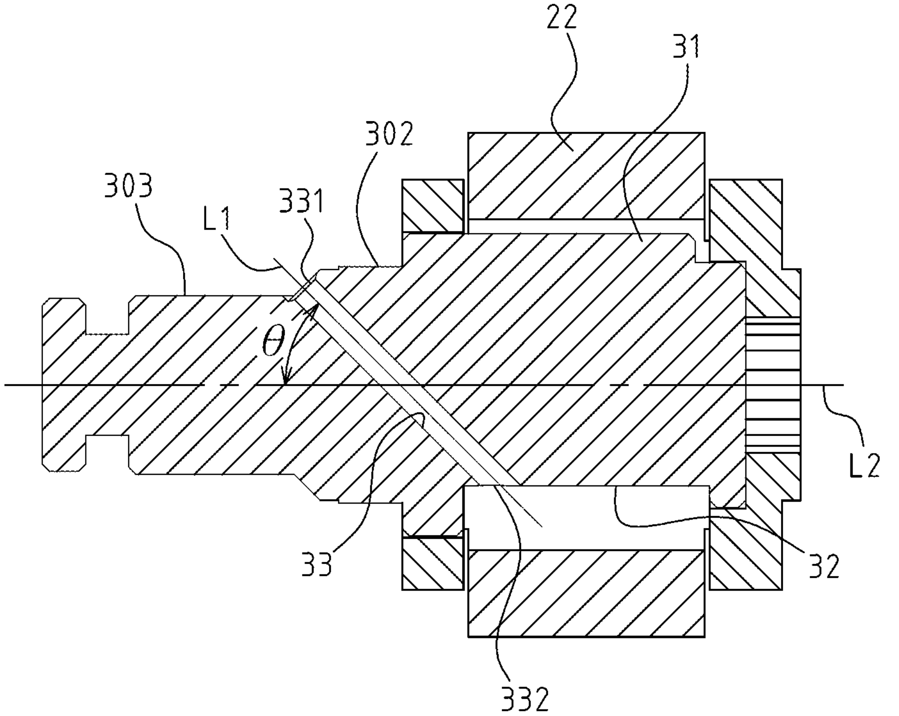
FIG. 5 is a cross-sectional of the main shaft in FIG. 4 when mounted into an impact device.

With reference to FIGS. 1, 4 and 5, the main shaft 30 is sequentially divided into an impact section 301, a penetrative section 302 and an output section 303. The impact section 301 is formed with at least one impact portion 31 and has at least one curved recess 32 defined therein, wherein the quantities of the at least one impact portion 31 and the at least one curved recess 32 are respectively relative to that of the at least one impact block 22, and the at least one impact portion 31 corresponds to the at least one impact block 22. The output section 303 and the penetrative section 302 sequentially extend through a front end of the power tool A for outputting power. In the preferred embodiment of the present invention, the penetrative section 302 is a cylinder for easily rotated relative to the power tool and the output section 303 is polygonal for mounting a marketed socket (not shown), wherein the contour of the penetrative section 302 is a circumcircle of that of the output section 303. Furthermore, the output section 303 is a tetragonal prism. A tapered face 304 is formed on an abutment between the output section 303 and the penetrative section 302. A linear tunnel 33 is defined in the main shaft 30. The linear tunnel 33 has two opposite ends respectively defined as an inlet 331 and an outlet 332, wherein the inlet 331 is situated in the output section 303, and the outlet 332 is situated in the impact section 301 and corresponds to the impact block 22. The axis L1 of said linear tunnel 33 and the axis L2 of said main shaft 30 interweave to form an included angle θ. The range of said included angle is between 20° and 70°. Said outlet 332 is located in the curved recess 32. Said inlet 331 and said outlet 332 are located at two opposite ends of the said main shaft, so that said main shaft 30 defines a first side and a second side on the two opposite sides of said axis L2, where said inlet 331 pieces through said first side and said 332 pieces through said second side. In the preferred embodiment of the present invention, the included angle is an acute angle and the inlet 331 is defined in the tapered face 304. Furthermore, the diameter of the inlet 331 is inwardly gradually reduced. In addition, the inlet 331 can also be defined in a ridge line of the output section 303 because the output section 303 is polygonal.

Figure 6:
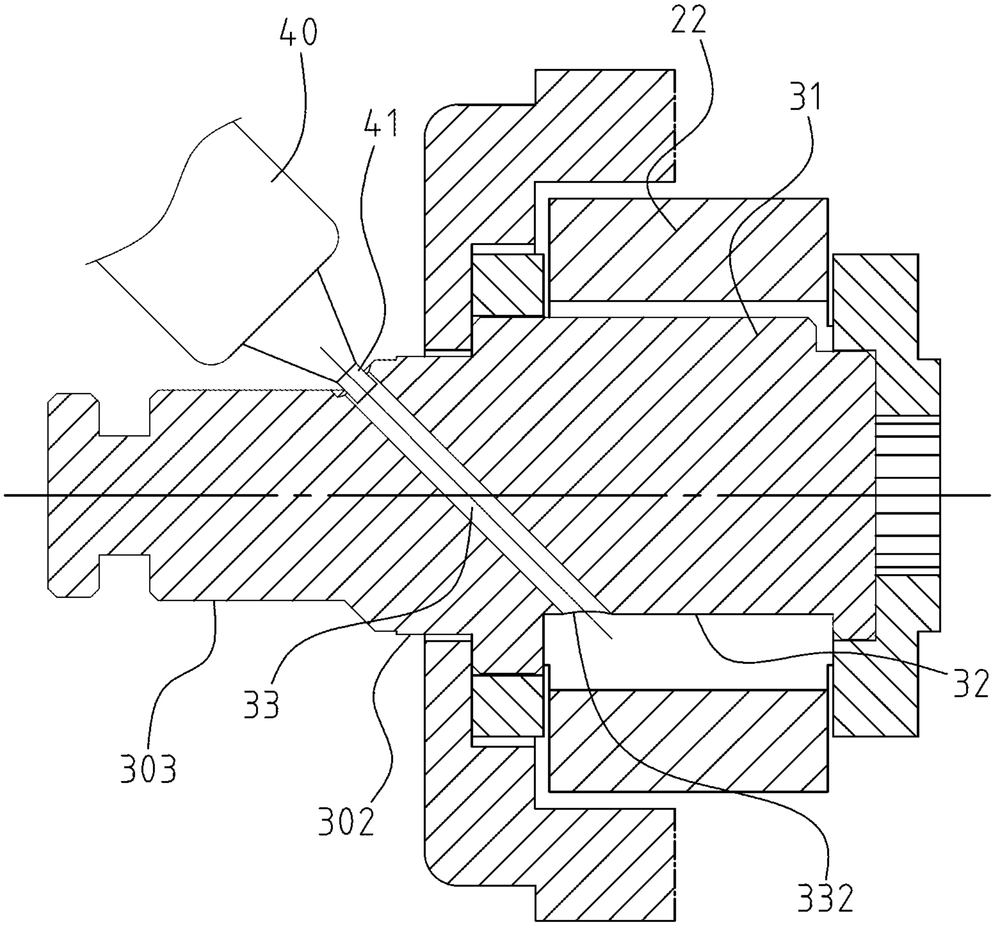
FIG. 6 is an operational view of the main shaft in accordance with the present invention.

Further with reference to FIGS. 1 and 6, before injecting lubricant into the impact device 20, the lubricant is previously filled into a lubricant injector 40 that has a nozzle 41 mounted to one end thereof. A free end of the nozzle 41 is withstood the inlet 331 such that the lubricant, in the lubricant injector 40, is filled into a space defined between the impact block 22 and the curved recess 32 by passing the linear tunnel 33 for delaying a wearing degree between the main shaft 30 and the impact device 20. As a result, the lifetime of the power tool A is lengthened. With referent to FIG. 6, the lubricant is moved to the space defined between the impact block 22 and the curved recess 32 only passing the linear tunnel 33 such that the moving lubricant forms no back pressure caused by a turn of a lubricant passage in the conventional main shaft of the power tool. Without back pressure during injecting lubricant, the operator can easily inject the lubricant into the impact device 20 and the injected lubricant would not be moved backward such that the area, surrounding the inlet 331, would not be polluted by the backward lubricant. Consequently, the debris would not be adhered to the main shaft 30 such that the inlet 331 is unblocked and the linear tunnel 33 is open.

The tapered face 304, between the output section 303 and the penetrative section 302, is provided for enhancing the structures of the output section 303 and the penetrative section 302 and preventing a working drill from being broken due to the included angle formed by the axes of the linear tunnel 33 and the main shaft 30. In addition, for preventing the main shaft 30 from being overly weakened, the diameter of the linear tunnel 33 is less than 3.0 mm. Furthermore, the tapered face 304 is previously defined a cone-shape dimple and a bottom of the cone-shaped dimple is co-axially drilled for defining the linear tunnel 33, wherein a maximum diameter of the cone-shaped dimple is greater than a diameter of the linear tunnel 33 such that the inlet 331 has a cone-shaped cross-section. In this manner, the linear tunnel 33 can be precisely processed for ensuring the value of the included angle formed by the axes of the linear tunnel 33 and the main shaft 30 and the consumption of the drill is reduced.

In addition, the cone-shaped inlet 331 provides a guiding effect to the nozzle 41 of the lubricant injector 40 during injecting lubricant into the space defined between the impact block 22 and the curved recess 32 for reducing the leaking rate. Furthermore, the cone-shaped inlet 331 is provided to nozzles 41 with different diameter for widely used.

Although the invention has been explained in relation to its preferred embodiment, it is to be understood that many other possible modifications and variations can be made without departing from the spirit and scope of the invention as hereinafter claimed.

I claim:

1. A power tool assembly comprising:

an impact device having a rotary set with a passage laterally defined therein and a through hole longitudinally defined therein, the through hole communicating with the passage;

at least one impact block mounted in the passage;

a main shaft sequentially divided into an impact section and a penetrative section and an output section, the impact section having at least one portion and having at least one curved recess defined therein, the at least one portion corresponding in location to the at least one impact block, the output section and the penetrative section adapted to extend sequentially through a front end of the power tool assembly so as to output power therefrom, said main shaft having a linear tunnel defined therein, the linear tunnel having opposite ends respectively defined as an inlet and an outlet, the inlet of the linear tunnel being positioned in the output section of said main shaft, the outlet of the linear tunnel being positioned in the impact section of said main shaft in a location corresponding to the at least one impact block, wherein an axis L1 of the linear tunnel and an axis L2 of said main shaft intersect so as to form an included angle, the included angle being between 20° and 70°, the outlet of the linear tunnel being positioned in the curved recess, the inlet and the outlet of the linear tunnel being located respectively at opposite ends of said main shaft such that said main shaft defines a first side and an opposite second side of axis L2, wherein the inlet extends through the first side of said main shaft and extends through the opposite second side of said main shaft, wherein a lubricant space is formed between the curved recess and said at least one impact block at an end of the impact section that passes through said main shaft.

2. The power tool assembly of claim 1, wherein a tapered face is formed on an abutment between the output section and the penetrative section of said main shaft, the inlet of the linear tunnel being defined in the tapered face.

3. The power tool assembly of claim 2, wherein the inlet of the linear tunnel has a diameter that reduces outwardly such that the inlet of the linear tunnel has a cone-shaped cross-section.

4. The power tool assembly of claim 3, wherein the penetrative section of said main shaft has a cylindrical shape, the output section of said main shaft being polygonal, wherein a contour of the penetrative section of said main shaft is circumcircle of the output section of said main shaft.

5. The power tool assembly of claim 4, wherein the inlet of the linear tunnel is defined in a ridge line of the output section of said main shaft.

6. The power tool assembly of claim 2, wherein the penetrative section of said main shaft has a cylindrical shape, the output section of said main shaft being polygonal, wherein a contour of the penetrative section of said main shaft is circumcircle of the output section of said main shaft.

7. The power tool assembly of claim 6, wherein the inlet of the linear tunnel is defined in a ridge line of the output section of said main shaft.

8. The power tool assembly of claim 1, wherein the penetrative section of said main shaft has a cylindrical shape, the output section of said main shaft being polygonal, wherein a contour of the penetrative section of said main shaft is circumcircle of the output section of said main shaft.

9. The power tool assembly of claim 8, wherein the inlet of the linear tunnel is defined in a ridge line of the output section of said main shaft.

10. A power tool comprising:

a casing having a handheld portion and a receiving portion;

a motor received in the receiving portion, said motor adapted to be connected to a power source;

an impact device mounted into a front section of the receiving portion, said impact device being drivingly connected to said motor;

a main shaft rotatably mounted in said impact device so as to output power, said impact device having a rotary seat with a passage laterally defined therein and a through hole longitudinal defined therein, the through hole communicating with the passage, the passage having at least one impact block mounted therein, said main shaft mountable into said impact device, said main shaft sequentially divided into an impact section and a penetrative section and an output section, the impact section having at least one portion and having at least one curved recess defined therein, the at least one portion corresponding in location to the at least one impact block, the output section and the penetrative section adapted to extend sequentially through a front end of the power tool assembly so as to output power therefrom, said main shaft having a linear tunnel defined therein, the linear tunnel having opposite ends respectively defined as an inlet and an outlet, the inlet of the linear tunnel being positioned in the output section of said main shaft, the outlet of the linear tunnel being positioned in the impact section of said main shaft in a location corresponding to the at least one impact block, wherein an axis L1 of the linear tunnel and an axis L2 of said main shaft intersect so as to form an included angle, the included angle being between 20° and 70°, the outlet of the linear tunnel being positioned in the curved recess, the inlet and the outlet of the linear tunnel being located respectively at opposite ends of said main shaft such that said main shaft defines a first side and an opposite second side of axis L2, wherein the inlet extends through the first side of said main shaft and extends through the opposite second side of said main shaft, wherein a lubricant space is formed between the curved recess and said at least one impact block at an end of the impact section that passes through said main shaft.

11. The power tool of claim 10, wherein a tapered face is formed on an abutment between the output section and the penetrative section of said main shaft, the inlet of the linear tunnel being defined in the tapered face.

12. The power tool of claim 11, wherein the inlet of the linear tunnel has a diameter that reduces outwardly such that the inlet of the linear tunnel has a cone-shaped cross-section.

13. The power tool of claim 12, wherein the penetrative section of said main shaft has a cylindrical shape, the output section of said main shaft being polygonal, wherein a contour of the penetrative section of said main shaft is circumcircle of the output section of said main shaft.

14. The power tool of claim 13, wherein the inlet of the linear tunnel is defined in a ridge line of the output section of said main shaft.

15. The power tool of claim 11, wherein the penetrative section of said main shaft has a cylindrical shape, the output section of said main shaft being polygonal, wherein a contour of the penetrative section of said main shaft is circumcircle of the output section of said main shaft.

16. The power tool of claim 15, wherein the inlet of the linear tunnel is defined in a ridge line of the output section of said main shaft.

17. The power tool of claim 10, wherein the penetrative section of said main shaft has a cylindrical shape, the output section of said main shaft being polygonal, wherein a contour of the penetrative section of said main shaft is circumcircle of the output section of said main shaft.

18. The power tool of claim 17, wherein the inlet of the linear tunnel is defined in a ridge line of the output section of said main shaft.

* * * * *